United States Patent
Huang et al.

(10) Patent No.: US 8,659,798 B2
(45) Date of Patent: Feb. 25, 2014

(54) MULTI-FUNCTION PRINTER AND CALIBRATING METHOD FOR MULTI-FUNCTION PRINTER

(75) Inventors: Yu-Chu Huang, New Taipei (TW); Yi-Che Chen, New Taipei (TW); King-Lung Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 215 days.

(21) Appl. No.: 13/327,865

(22) Filed: Dec. 16, 2011

(65) Prior Publication Data

US 2012/0257223 A1 Oct. 11, 2012

(30) Foreign Application Priority Data

Apr. 6, 2011 (TW) .............................. 100111849 A

(51) Int. Cl.
*G06K 15/00* (2006.01)
*H04N 1/409* (2006.01)

(52) U.S. Cl.
USPC .......................................... 358/3.27; 358/1.18

(58) Field of Classification Search
USPC ........................ 358/1.9, 504, 2.26, 3.27, 1.18
See application file for complete search history.

(56) References Cited

U.S. PATENT DOCUMENTS

2003/0007166 A1* 1/2003 Sato ............................... 358/1.9

* cited by examiner

*Primary Examiner* — Barbara Reinier
(74) *Attorney, Agent, or Firm* — Altis Law Group, Inc.

(57) ABSTRACT

A multi-function printer and a method for calibrating the multi-function printer is disclosed The calibrating method for a printer comprises printing a calibration pattern on a medium by the printer; obtaining a scanned image of the calibration pattern on the medium printed by the printer; comparing the scanned image against the calibration pattern; detecting defects of the scanned image; and if the defects exceed an pre-determined value, adjusting print settings of the printer according to the defects of the scanned image.

15 Claims, 7 Drawing Sheets

MULTI-FUNCTION PRINTER AND CALIBRATING METHOD FOR MULTI-FUNCTION PRINTER

BACKGROUND

1. Technical Field

The disclosure generally relates to a multi-function printer and a method for calibrating the multi-function printer.

2. Description of Related Art

Multi-function printers (MFPs) including scanner units and printer units are used widely because MFPs are relatively small in size with low noise and can perform color copying, printing, and scanning at low cost. The scanner head of a scanner unit in an MFP may include an image sensor such as a charge coupled device (CCD) and a contact image sensor (CIS). The printer unit of an MFP may include an inkjet printer or a laser printer.

The output quality by the printer unit of an MFP may vary over time due to factors such as media variability, aging of the printer unit's components, and changes in the printer unit's environment. To achieve a consistent performance of the printer unit of an MFP, there is a need for a technique for dynamically calibrating the print unit of the MFP according to its latest status and/or environment.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
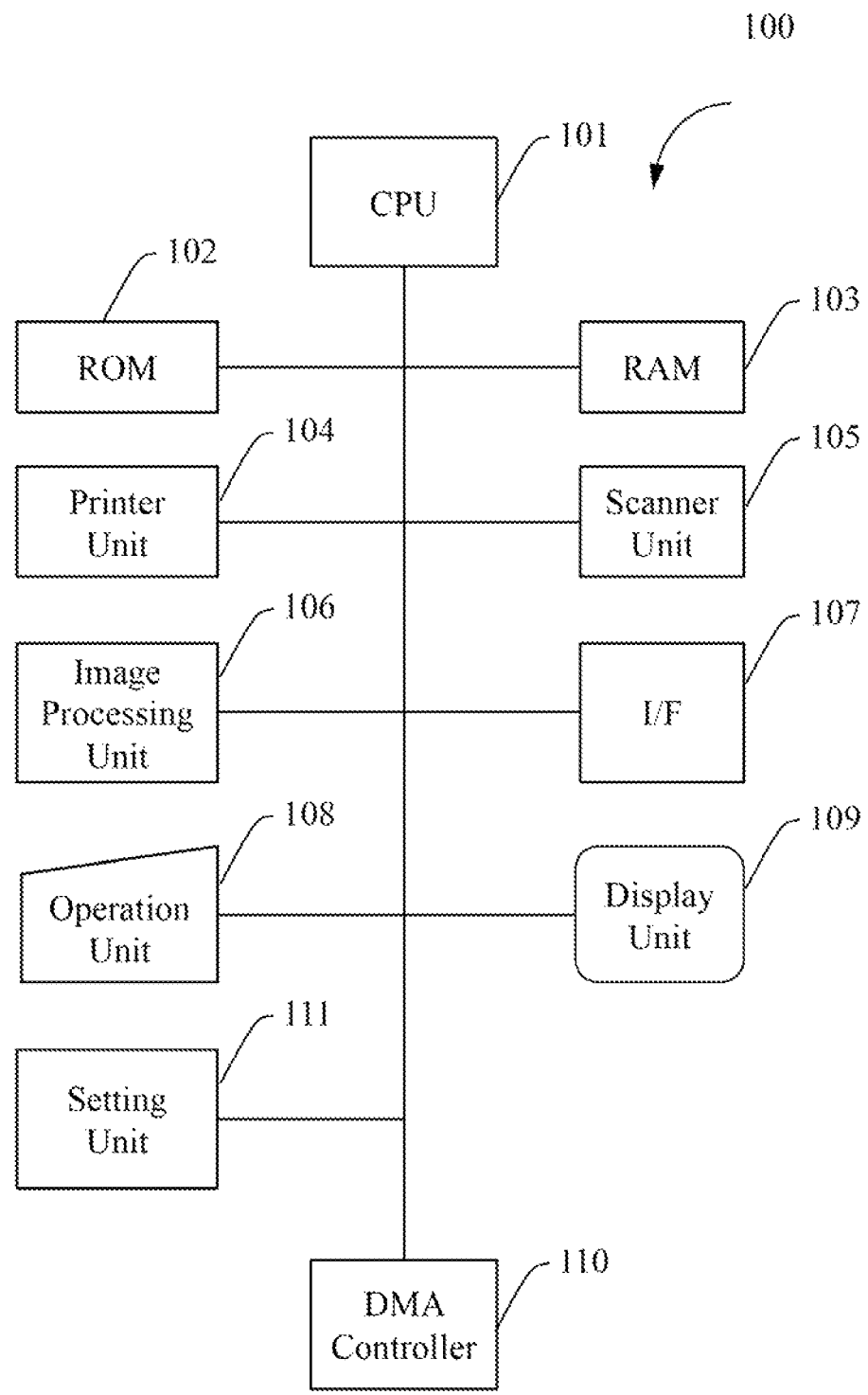
FIG. 1 is a functional block diagram of a multi-function printer (MFP) which is an example of an image processing apparatus according to one embodiment.

FIG. 1 is a functional block diagram of a multi-function printer (MFP) 100 which is an example of an image processing apparatus according to one embodiment. The MFP 100 comprises a CPU 101, a ROM 102, a RAM 103, a printer unit 104, a scanner unit 105, an image processing unit 106, an I/F (interface) 107, an operation unit 108, a display unit 109, a DMA controller 110, and a setting unit 111.

The CPU 101 is a processor capable of controlling the overall MFP 100. The MFP 100 is controlled by running a program (firmware) stored in the ROM 102.

The ROM 102 is non-volatile memory capable of storing the program for controlling the MFP 100.

The RAM 103 is volatile memory which is used as a working area when the CPU 101 runs the program stored in the ROM 102. The RAM 103 is also used as buffer memory for temporarily storing image data from the scanner unit 105.

The printer unit 104 may print image data on a sheet of paper, an OHP sheet, or other medium (hereinafter referred to as a "printing medium"). In one embodiment, the printer unit 104 is an inkjet printer which comprises a printhead, a motor, and an ink cartridge. The printer unit 104 causes a carriage having the printhead to scan on the printing medium in a reciprocating manner and apply ink to the printing medium. Printing is performed by transporting the printing medium according to the scanning perpendicularly to the scanning direction of the carriage.

The scanner unit 105 may scan images on a sheet of paper, a plastic sheet, a film, and so on and generate image data. The scanner unit 105 temporarily buffers, in the RAM 103, image data having been generated by the scanned images.

The scanner unit 105 may comprise a scanner head which has a scanning width corresponding to an overall width of the largest readable medium (for example, A4-size paper). In the scanner head, a plurality of CCDs (or CISs) may be in a scanning width direction. Image data is obtained by electrically scanning the plurality of CCDs. Further, the scanner head may be mechanically scanned by a motor perpendicularly to the scanning width direction of the CCDs. Overall image of the medium can be scanned by combining the electrical scanning and the mechanical scanning. In the present embodiment, a direction of electrical scanning is called "main scanning direction" and a direction of mechanical scanning is called "sub scanning direction."

The scanner unit 105 may scan images line-by-line and generate color image data, wherein the color components, including RGB (red, green, blue) components, are represented in, for example, 8 bits (0 to 255). A number of bits representing each pixel can be freely set within the capability of the CCDs or CISs. The number of bits is called "image level" or "color depth."

The image processing unit 106 may perform digital image processing such as level analysis, color correction, and filter processing on image data which have been buffered in the RAM 103 by the scanner unit 105.

The I/F 107 is an interface for allowing the MFP 100 to communicate with various external devices. External devices may include, for example, a personal computer (PC), and a drive for reading and writing data in a storage medium such as a memory card. I/F 107 may include USB and IEEE 1394.

The operation unit 108 may be operated by a user to provide the MFP 100 with various instructions. Instructions may be a scan instruction to cause the scanner unit 105 to scan images on a medium, or a print instruction to cause the printer unit 104 to print images on a printing medium. The instructions to the MFP 100 may be provided from a PC, or the like, through the I/F 107.

The display unit 109 may display information to the user, and be made up of an LCD, an LED, or the like. The information displayed to the user may be a state of the MFP 100 (scanning, printing, or idling), or a setting menu of the MFP 100.

The DMA controller 110 is a controller for transferring data between the constituent elements of the MFP 100 through DMA transfer.

The printer unit 104 may print a calibration pattern on a printing medium. The scanner unit 105 may obtain a scanned image by scanning the medium. The image processing unit 106 may detect any defects of the scanned image by comparing the scanned image against the calibration pattern; and the setting unit 111 may adjust print settings of the printer unit 104 according to the defects in the scanned image.

The setting unit 111 may disable or enable overall settings of the MFP 100 or components of the MFP, such as the printer unit 104 and the scanner unit 105.

Figure 2:
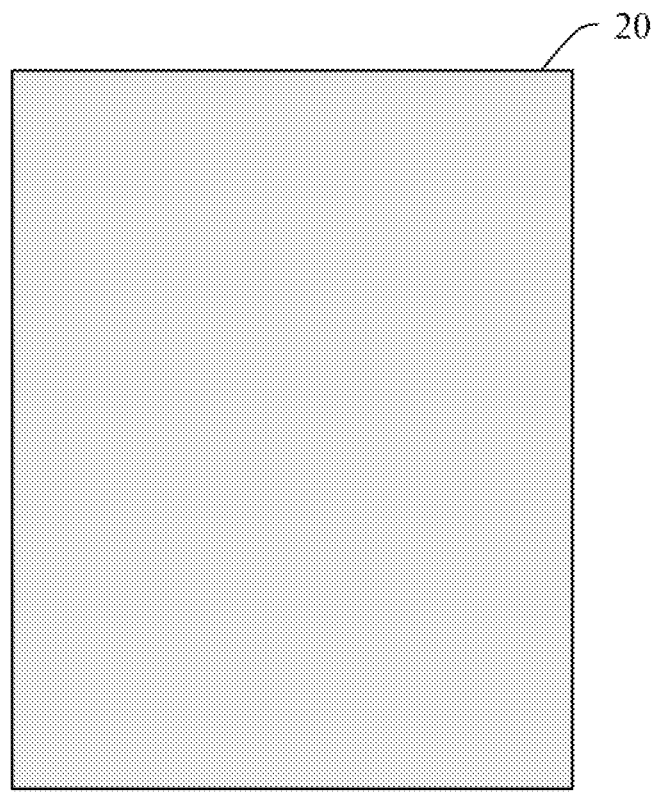
FIG. 2 shows a first calibration pattern.

FIG. 2 shows a first calibration pattern 20. The first calibration pattern 20 is an image filled with pixels each having a same, preset image level. For example, all the pixels of the first calibration pattern 20 have the same image level of "130".

Figure 3:
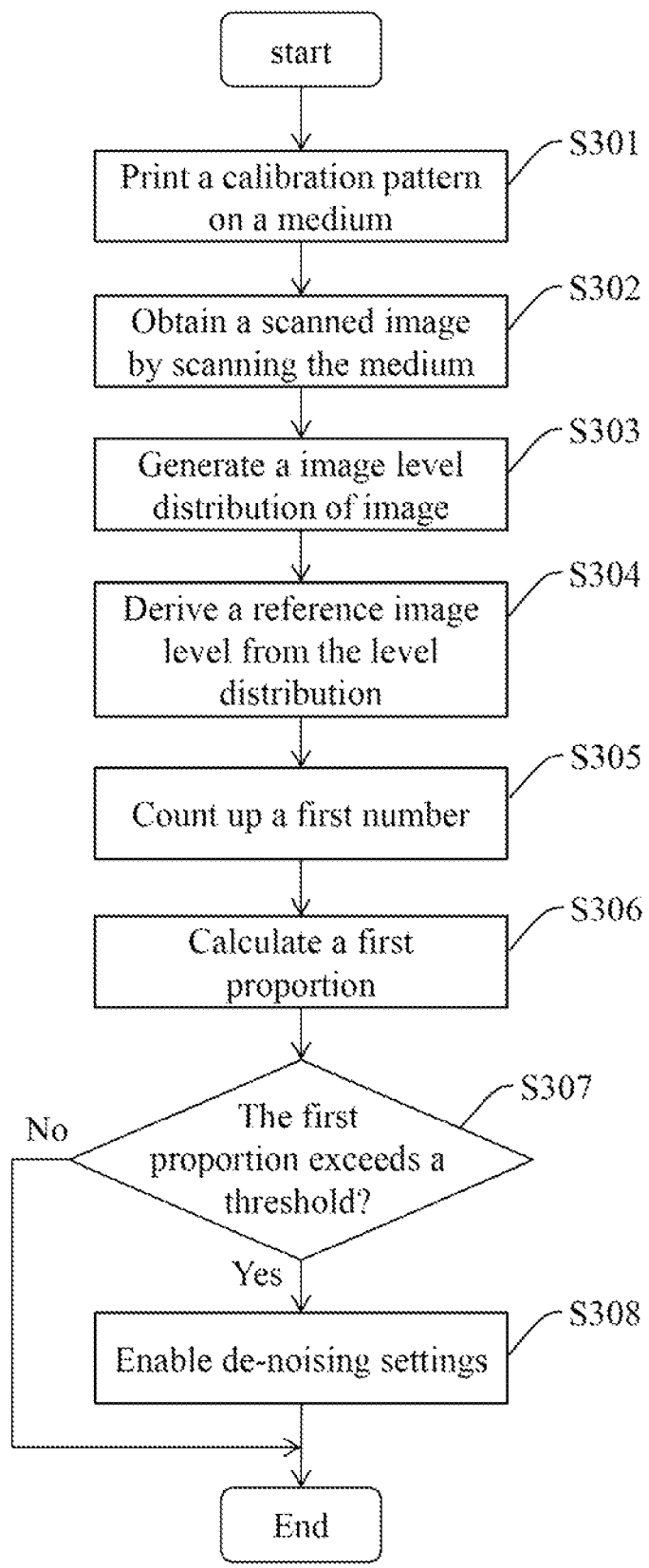
FIG. 3 is a flowchart showing one embodiment of a method for calibrating the MFP of FIG. 1 using the first calibration pattern.

FIG. 3 is a flowchart showing one embodiment of a method for calibrating the MFP 100 using the first calibration pattern 20. The method comprises the following steps:

In step S301, the printer unit 104 prints the calibration pattern 20 on a printing medium.

In step S302, the scanner unit 105 obtains a scanned image by scanning the printed medium.

Figure 4:
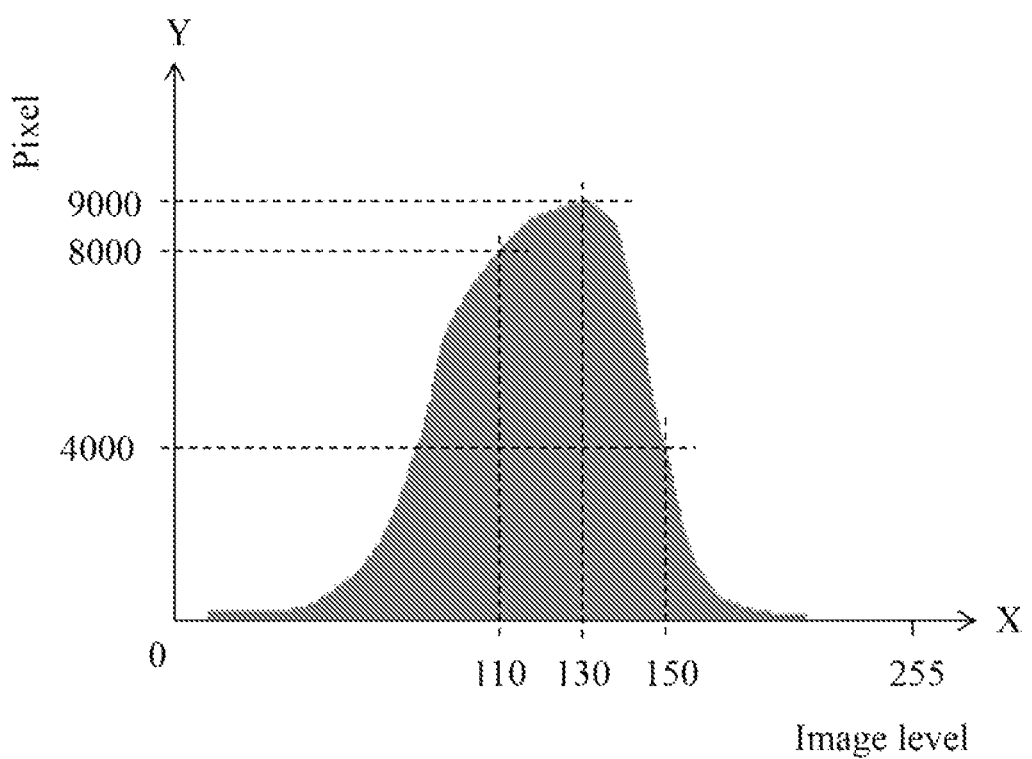
FIG. 4 is an image level histogram representing an image level distribution of a scanned image obtained by the MFP of FIG. 1.

In step S303, the image processing unit 106 generates an image level distribution of the scanned image such as FIG. 4. FIG. 4 shows an image level histogram representing the image level distribution of the scanned image. An x-axis of the image level histogram represents image levels of the scanned image, and a y-axis of the image level histogram represents a number of pixels. The image level histogram is a statistical chart primarily illustrating the number of pixels in each image level. Therefore, the image level histogram of FIG. 4 reveals the image level distribution conditions of the scanned image. The gray area under the curve of the image level histogram represents a total number of pixels of the scanned image. In FIG. 4, the range of image levels is from 0 to 255.

In step S304, the image processing unit 106 derives a reference image level which has a maximal number of pixels from the image level distribution. For example, according to the image level histogram of FIG. 4, an image level of "130" has the maximal number of pixels. The image level "130" may be the reference image level.

In step S305, the image processing unit 106 counts up a first number of pixels which have an image level outside the range based on the reference image level. For example, in FIG. 4, a range of (110, 150) may be defined as inside the range based on the reference image level of 130. If the image level of a pixel is outside the defined range of (110, 150), the pixel may be counted into the first number.

In step S306, the image processing unit 106 calculates a first proportion which is a ratio of the first number relative to the total number of pixels of the scanned image.

In step S307, if the first proportion of the first number relative to the total number of pixels exceeds a threshold, such as 10%, the flow goes to step S308. If the first proportion is equal to, or less than the threshold, calibration of the MFP 100 has completed and the flow ends.

In step S308, the setting unit 111 enables and applies de-noising settings of the printer unit 104 to eliminate potential noises introduced by the printer unit 104.

Figure 5:
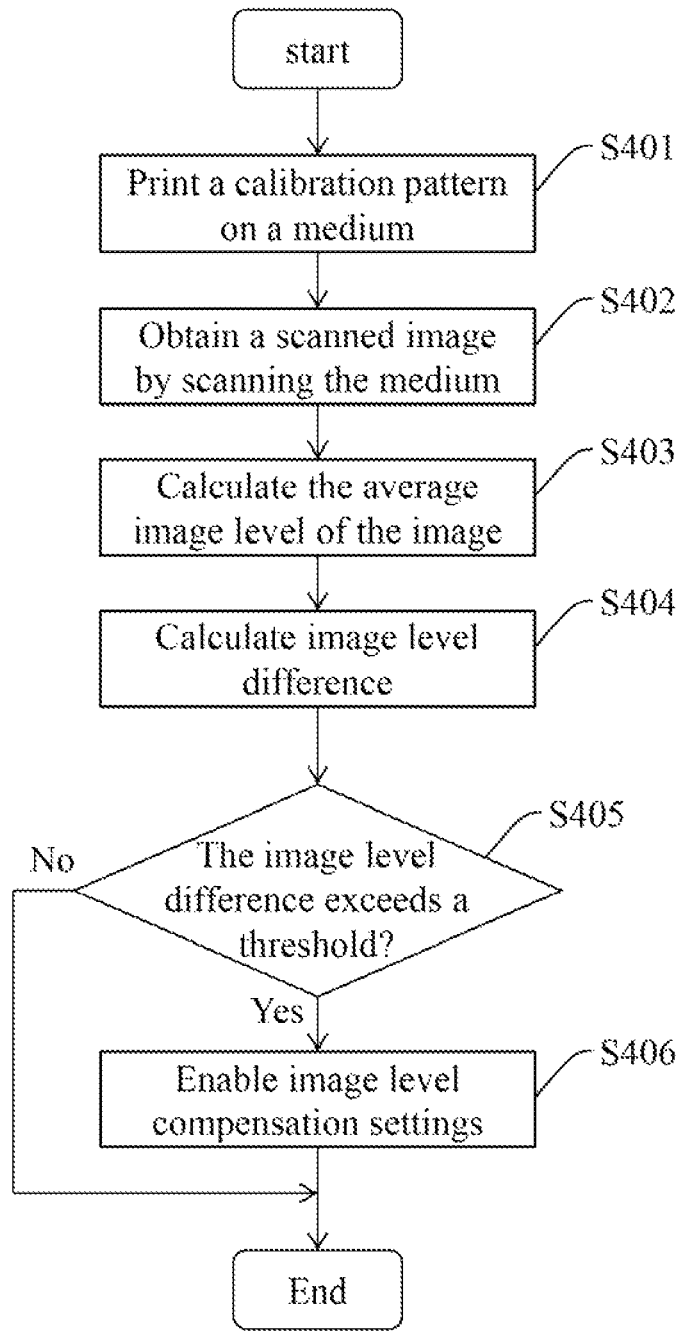
FIG. 5 is a flowchart showing another embodiment of a method for calibrating the MFP of FIG. 1 using the first calibration pattern.

FIG. 5 is a flowchart showing another embodiment of a method for calibrating the MFP 100 using the first calibration pattern 20. The method comprises the following steps:

In step S401, the printer unit 104 prints the calibration pattern 20 on a printing medium.

In step S402, the scanner unit 105 obtains a scanned image by scanning the printed medium.

In step S403, the image processing unit 106 calculates an average image level of the scanned image. In one embodiment, an average image level is an arithmetic average of the image level distribution of the scanned image.

In step S404, the image processing unit 106 calculates an image level difference between the average image level of the scanned image and the preset image level of the first calibration pattern 20.

In step S405, if the image level difference exceeds a threshold, such as 30, the flow goes to step S406. If the image level difference is equal to, or less than the threshold, calibration of the MFP 100 has completed and the flow ends.

In step S406, the setting unit 111 enables and applies image level compensation settings of the printer unit 104 to drive the image level difference between the average image level of the scanned image and the preset image level of the first calibration pattern 20 down to zero.

Figure 6:
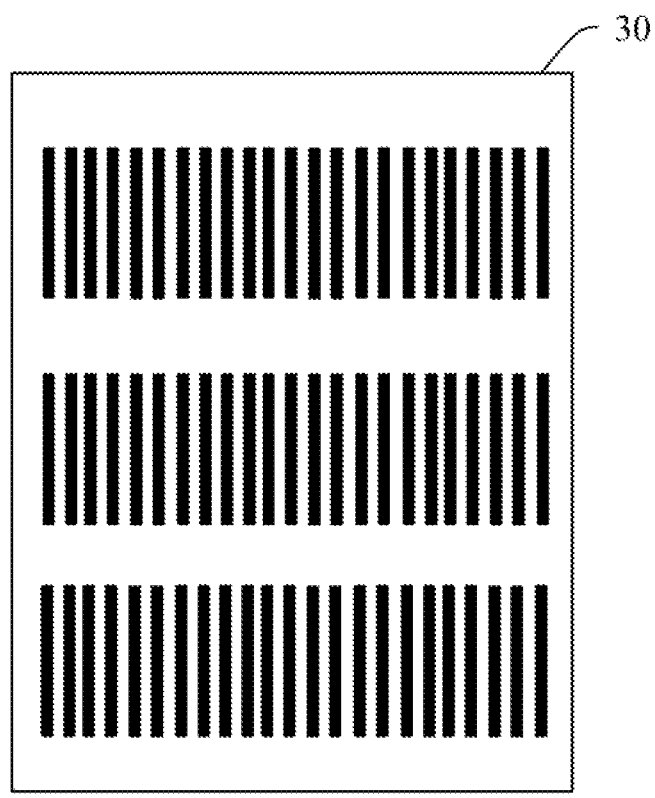
FIG. 6 shows a second calibration pattern.

FIG. 6 shows a second calibration pattern 30. The second calibration pattern 30 is an image including a plurality of black stripes.

Figure 7:
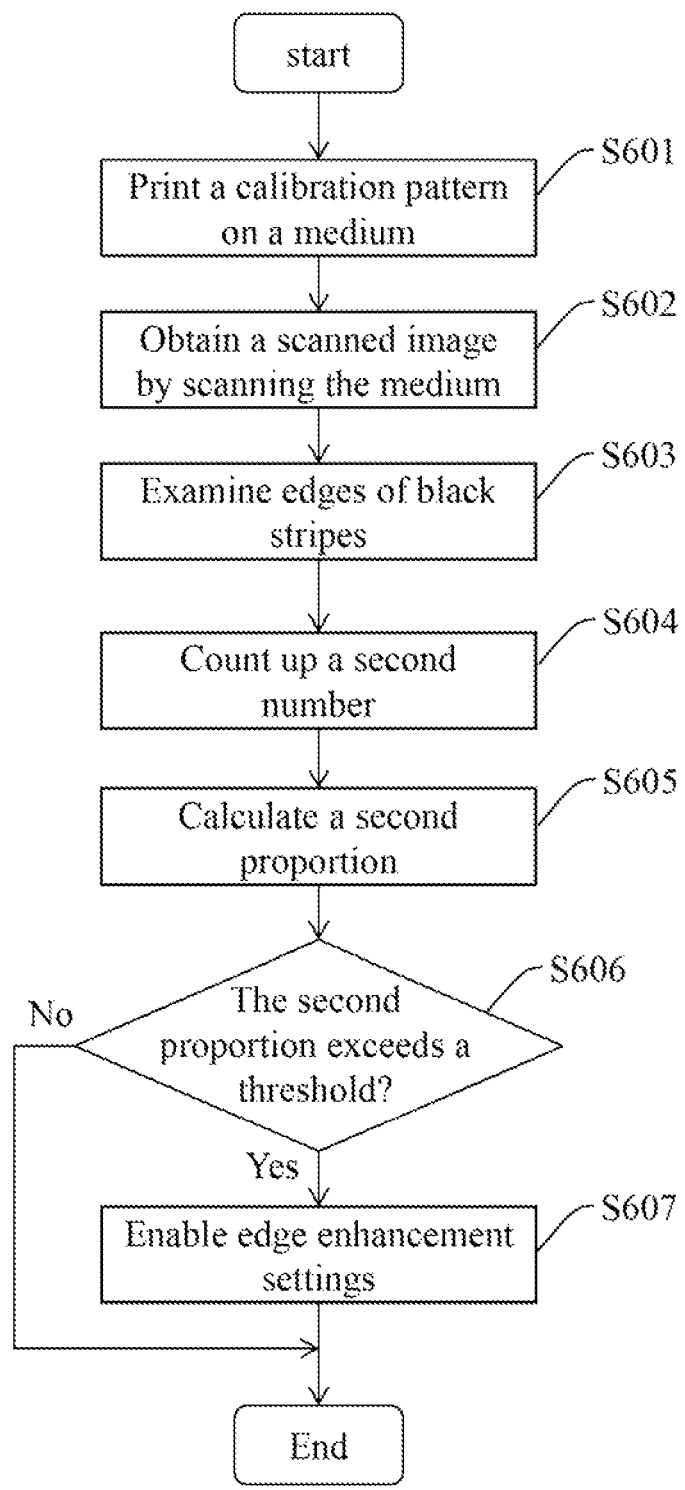
FIG. 7 is a flowchart showing one embodiment of a method for calibrating the MFP of FIG. 1 using the second calibration pattern.

FIG. 7 is a flowchart showing one embodiment of a method for calibrating the MFP 100 using the second calibration pattern 30. The method comprises the following steps:

In step S601, the printer unit 104 prints the calibration pattern 30 on a printing medium.

In step S602, the scanner unit 105 obtains a scanned image by scanning the printed medium.

In step S603, the image processing unit 106 examines edges of the plurality of black stripes in the scanned image and determines whether the edges are jagged or not.

In step S604, the image processing unit 106 counts up a second number of black stripes which have jagged edges in the scanned image. If a black stripe has at least one edge that is jagged, the black stripe will be counted into the second number.

In step S605, the image processing unit 106 calculates a second proportion which is a ratio of the second number relative to a total number of stripes in the plurality of black stripes of the scanned image.

In step S606, if the second proportion of the second number relative to the total number of stripes of the scanned image exceeds a threshold, the flow goes to step S607. If the second proportion is equal to, or less than the threshold, calibration of the MFP 100 has completed and the flow ends.

In step S606, the setting unit 111 enables and applies edge enhancement settings of the printer unit 104 to make edges of images printed by the printer unit 104 smoother and more distinct.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn for or in relation to a method may include some indication in reference to certain steps. However, any indication used is only to be viewed for identification purposes and not as a suggestion as to an order for the steps.

What is claimed is:

1. A calibrating method for a printer, the calibrating method comprising:
   printing a calibration pattern on a medium by the printer, wherein the calibration pattern is an image filled with pixels each having a same, preset image level;
   obtaining a scanned image of the calibration pattern on the medium printed by the printer;
   comparing the scanned image against the calibration pattern;
   detecting defects of the scanned image; and
   if the defects exceed an pre-determined value, adjusting print settings of the printer according to the defects of the scanned image;
   wherein the step of detecting defects of the scanned image comprises:
   generating an image level distribution of the scanned image having a total number of pixels;
   deriving a reference image level which has a maximal number of pixels from the image level distribution;
   counting up a first number of pixels which have image levels outside a pre-determined range of the reference image level; and
   calculating a first proportion of the first number relative to the total number of pixels of the scanned image.

2. The calibrating method of claim 1, wherein the step of adjusting print settings of the printer comprises enabling de-noising settings of the printer if the first proportion exceed the pre-determined value.

3. The calibrating method of claim 1, wherein the step of detecting defects of the scanned image comprises:
   calculating an average image level of pixels of the scanned image; and
   calculating an image level difference between the average image level and the preset image level of the calibration pattern.

4. The calibrating method of claim 3, wherein the step of adjusting print settings of the printer comprises enabling level compensation settings of the printer if the image level difference exceeds the pre-determined value.

5. The calibrating method of claim 1, wherein the calibration pattern is an image comprising a plurality of black stripes.

6. The calibrating method of claim 5, wherein the step of detecting defects of the scanned image comprises:
   examining edges of black stripes in the scanned image;
   counting up a second number of black stripes which have at least one jagged edge in the scanned image; and
   calculating a second proportion of the second number relative to a total number of black stripes of the calibration pattern.

7. The calibrating method of claim 6, wherein the step of adjusting print settings of the printer comprises enabling edge enhancement settings of the printer if the second proportion exceeds the pre-determined value.

8. A multi-function printer (MFP), comprising:
   a printer unit adapted to print a calibration pattern on a medium, wherein the calibration pattern is an image filled with pixels each having a same, preset image level;
   a scanner unit adapted to obtain a scanned image of the calibration pattern on the medium printed by the print unit;
   an image processing unit adapted to compare the scanned image against the calibration pattern, and to detect defects of the scanned image; and
   a setting unit adapted to adjust print settings of the printer unit if the defects of the scanned image exceeds a pre-determined value;
   wherein the image processing unit is adapted to generate an image level distribution of the scanned image having a total number of pixels, to derive an image reference level which has a maximal number of pixels from the image level distribution, to count up a first number of pixels which have levels outside a pre-determined range of the reference image level, and to calculate a first proportion of the first number relative to the total number of pixels of the scanned image.

9. The MFP of claim 8, wherein the setting unit is adapted to enable de-noising settings of the printer unit if the first proportion exceeds the pre-determined value.

10. The MFP of claim 8, wherein the image processing unit is adapted to calculate an average image level of pixels of the scanned image, and to calculate an image level difference between the average image level and the preset image level of the calibration pattern.

11. The MFP of claim 10, wherein the setting unit is adapted to enable level compensation settings of the printer if the image level difference exceeds the pre-determined value.

12. The MFP of claim 8, wherein the calibration pattern is an image comprising a plurality of black stripes.

13. The MFP of claim 12, wherein the image processing unit is adapted to examine edges of black stripes in the scanned image, to count up a second number of black stripes which have at least one jagged edge in the scanned image, and to calculate a second proportion of the second number relative to a total number of black stripes of the calibration pattern.

14. The MFP of claim 13, wherein the setting unit is adapted to enable edge enhancement settings of the printer if the second proportion exceeds the-pre-determined value.

15. A multi-function printer (MFP) controlling method, wherein the MFP comprises a printer unit and a scanner unit, the MFP controlling method comprising:
   the printer unit printing a calibration pattern on a medium, wherein the calibration pattern is an image filled with pixels each having a same, preset image level;
   the scanner unit scanning an image of the calibration pattern on the medium printed by the printer unit;
   comparing the scanned image against the calibration pattern;
   detecting defects of the scanned image; and
   if the defects exceed a pre-determined value, adjusting print settings of the printer unit according to the defects of the scanned image;
   wherein the detecting defects of the scanned image comprises calculating an average image level of pixels of the scanned image, and calculating an image level difference between the average image level and the preset image level; and the adjusting print settings of the printer unit comprises enabling level compensation settings of the printer unit if the image level difference exceeds the pre-determined value.

* * * * *